US011435856B2

(12) United States Patent
Kusakabe et al.

(10) Patent No.: US 11,435,856 B2
(45) Date of Patent: Sep. 6, 2022

(54) INFORMATION PROCESSING DEVICE, INFORMATION PROCESSING METHOD, AND PROGRAM

(71) Applicant: SONY GROUP CORPORATION, Tokyo (JP)

(72) Inventors: Yuri Kusakabe, Tokyo (JP); Yu Aoki, Tokyo (JP); Kentaro Ida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/287,751

(22) PCT Filed: Sep. 6, 2019

(86) PCT No.: PCT/JP2019/035108
§ 371 (c)(1),
(2) Date: Apr. 22, 2021

(87) PCT Pub. No.: WO2020/090227
PCT Pub. Date: May 7, 2020

(65) Prior Publication Data
US 2021/0397296 A1  Dec. 23, 2021

(30) Foreign Application Priority Data
Nov. 1, 2018 (JP) .............................. JP2018-206588

(51) Int. Cl.
*G06F 3/042* (2006.01)
*G06T 7/70* (2017.01)
(Continued)

(52) U.S. Cl.
CPC .......... *G06F 3/0425* (2013.01); *G06F 3/0346* (2013.01); *G06F 3/03542* (2013.01);
(Continued)

(58) Field of Classification Search
CPC .. G06F 3/03545; G06F 3/0386; G06F 3/0425; G06F 3/03542; G06F 3/017; G06F 3/0346; G03B 17/54
See application file for complete search history.

(56) References Cited

U.S. PATENT DOCUMENTS

2014/0306939 A1* 10/2014 Tamura ................. G06F 3/0425
345/178
2017/0351324 A1  12/2017 Njolstad et al.
(Continued)

FOREIGN PATENT DOCUMENTS

JP  2012-053603 A   3/2012
JP  2012-198858 A  10/2012
(Continued)

OTHER PUBLICATIONS

He et al., Real-Time Whiteboard Capture and Processing Using a Video Camera for Teleconferencing, IEEE ICASSP '05, Mar. 23, 2005, pp. 1113-1116, IEEE.

*Primary Examiner* — Koosha Sharifi-Tafreshi
(74) *Attorney, Agent, or Firm* — Paratus Law Group, PLLC

(57) ABSTRACT

There is provided an information processing device, an information processing method, and a system that are able to enhance convenience of a user by guiding the user to an appropriately recognizable area in a case where a position of an operating tool that is being operated is in an unrecognizable area. The information processing device includes a controller (120, 140, 170) that performs a recognition process of recognizing, on a basis of a captured image obtained by imaging a projection area, the position of the operating tool inside the projection area, an operation detection process of detecting, on a basis of sensor data outputted by a sensor included in the operating tool, that an operation is performed on the operating tool, and, a case where the operation performed on the operating tool is detected by the
(Continued)

operation detection process and the position of the operating tool is not recognized by the recognition process, a projection control process of causing a projection section to project an image for guiding the operating tool to a position which is inside the projection area and where the position of the operating tool is recognizable by the recognition process.

16 Claims, 12 Drawing Sheets

(51) Int. Cl.
　　　*G06F 3/0346*　　　(2013.01)
　　　*G06F 3/0354*　　　(2013.01)
　　　*H04N 9/31*　　　　(2006.01)
(52) U.S. Cl.
　　　CPC ................ *G06T 7/70* (2017.01); *H04N 9/31* (2013.01); *G06T 2207/30196* (2013.01)

(56) References Cited

U.S. PATENT DOCUMENTS

| | | | |
|---|---|---|---|
| 2018/0217683 A1 | 8/2018 | Kobayashi et al. | |
| 2020/0082795 A1* | 3/2020 | Ano | G06F 3/04847 |

FOREIGN PATENT DOCUMENTS

| | | |
|---|---|---|
| JP | 2014-199633 A | 10/2014 |
| JP | 2016-024518 A | 2/2016 |
| JP | 2018-198858 A | 12/2018 |

\* cited by examiner

[FIG. 1]
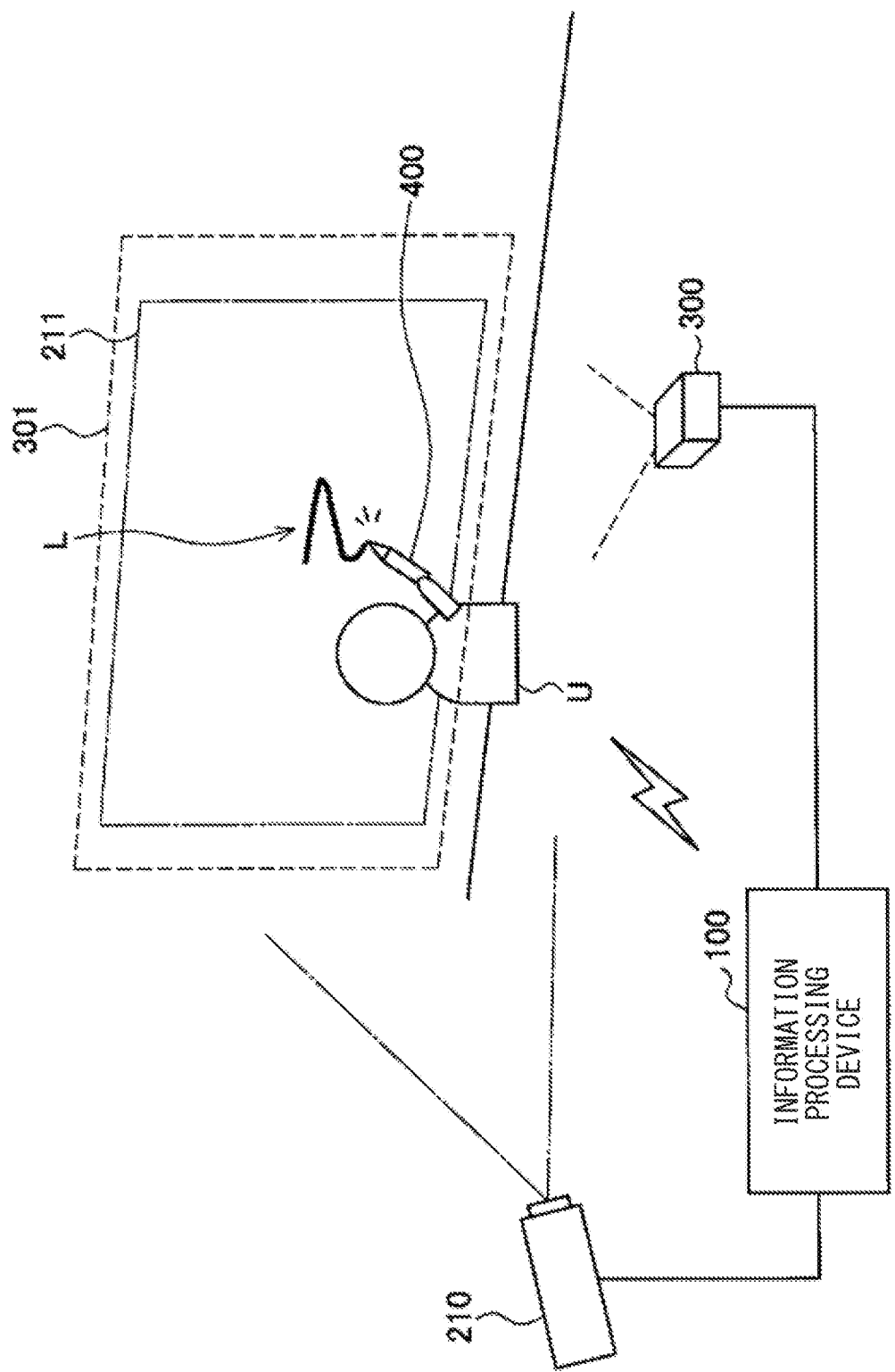

[FIG. 2]
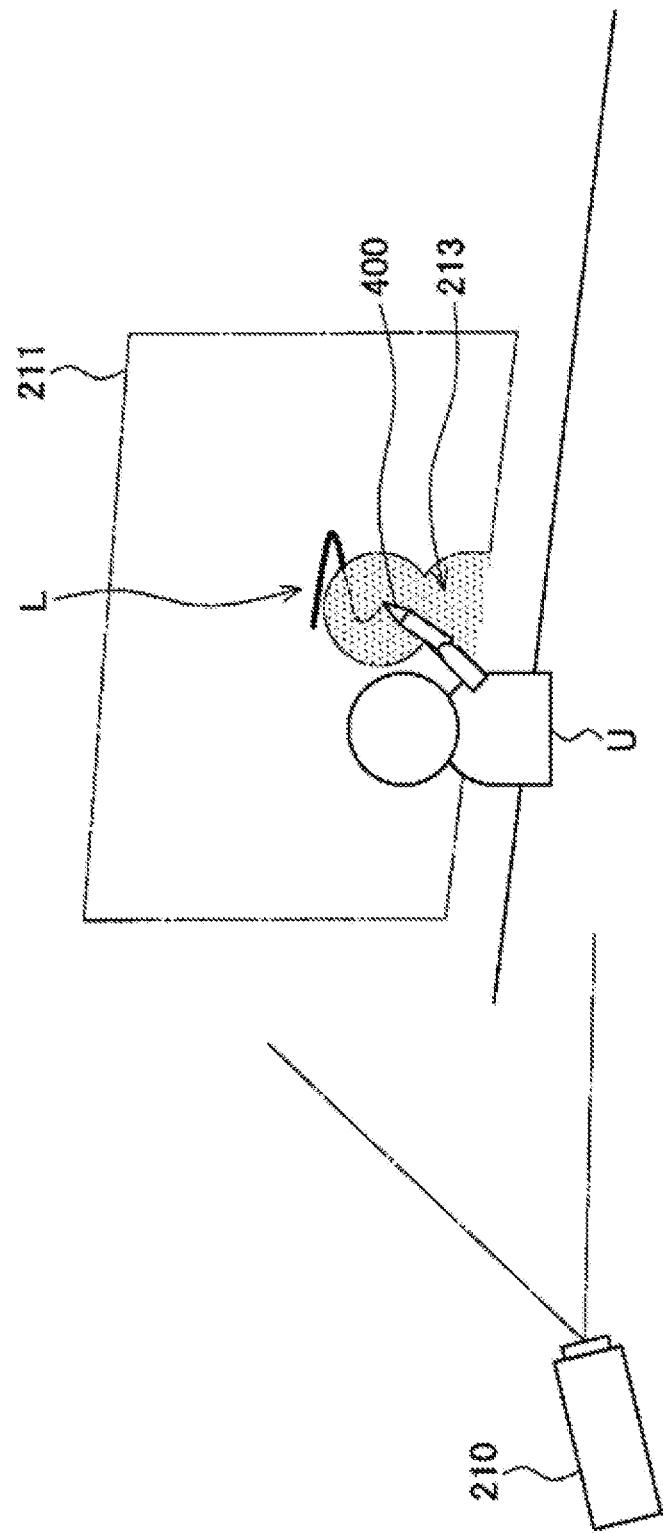

[FIG. 3]
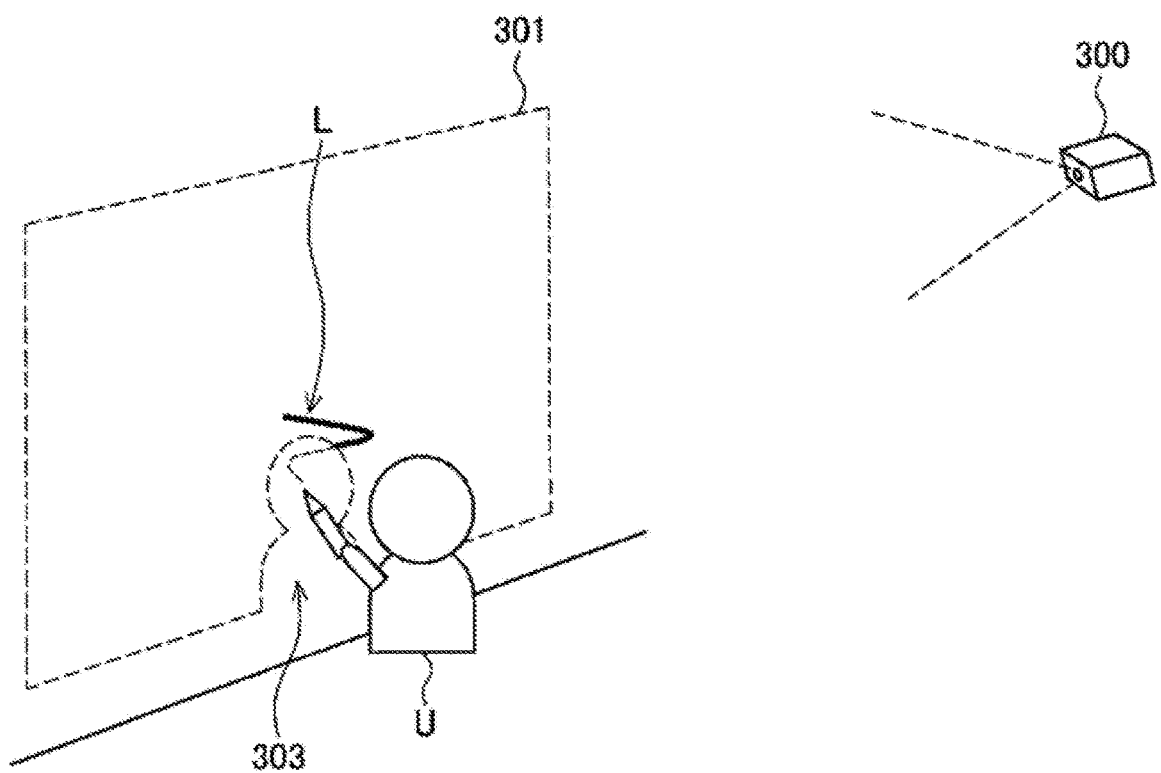

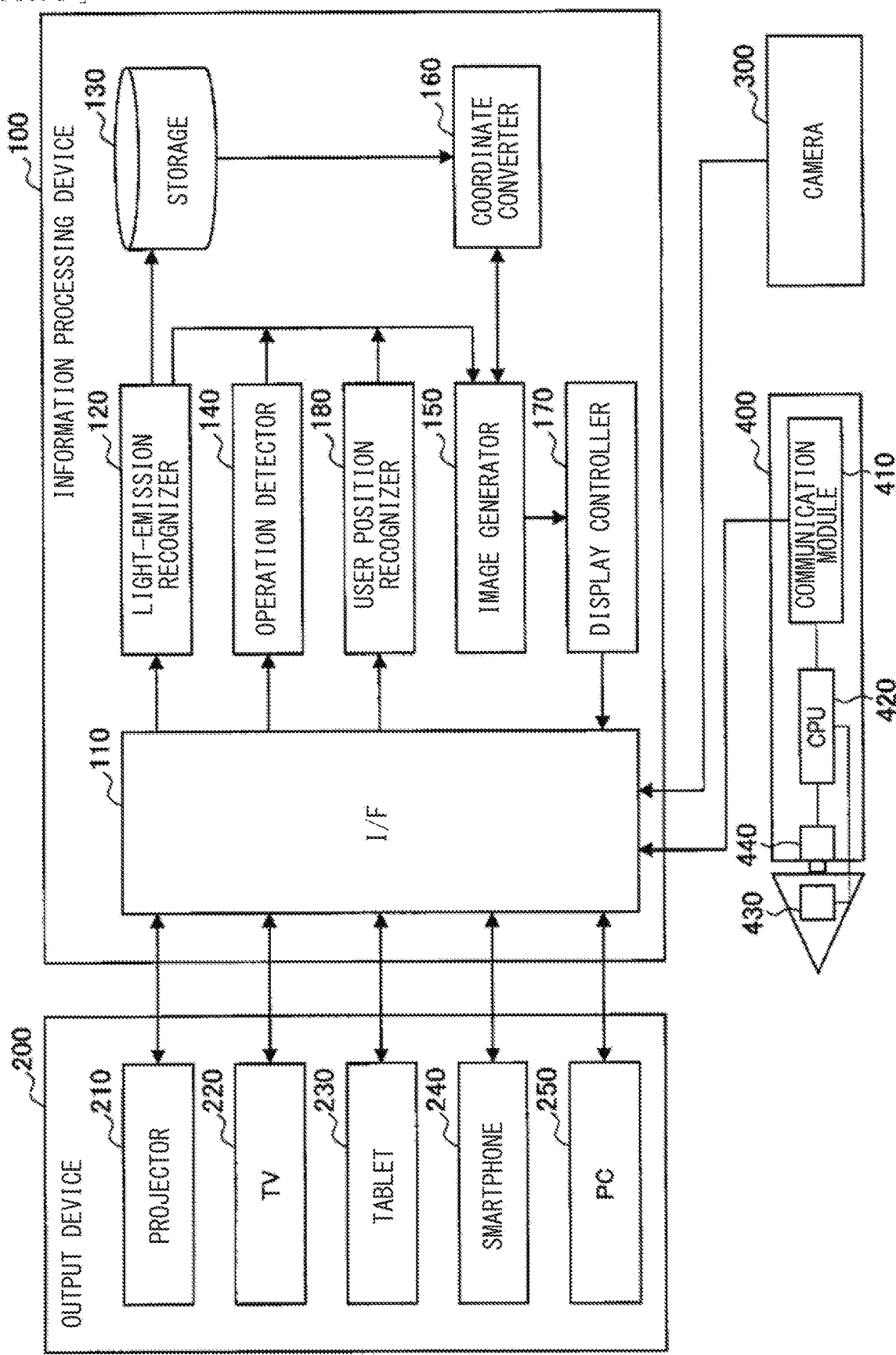
[FIG. 4]

[FIG. 5]
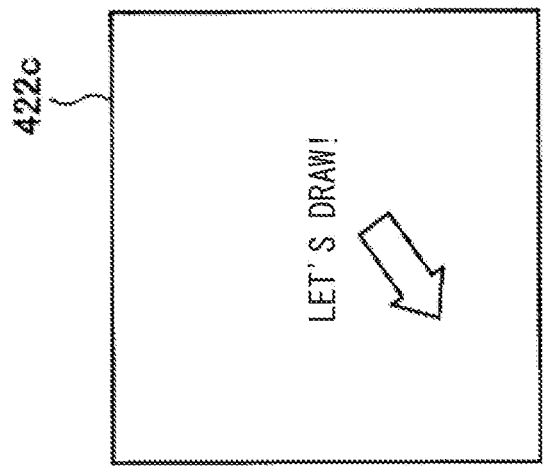
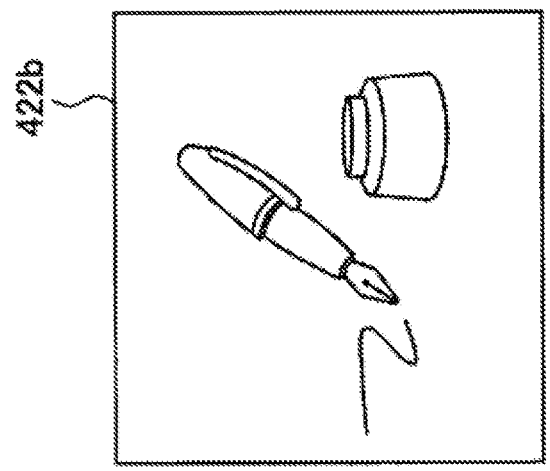
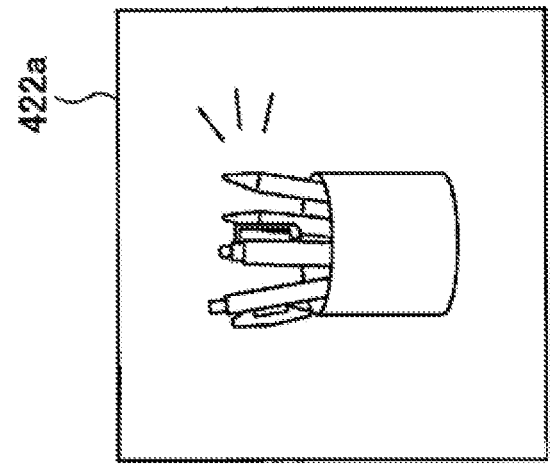

[FIG. 6]
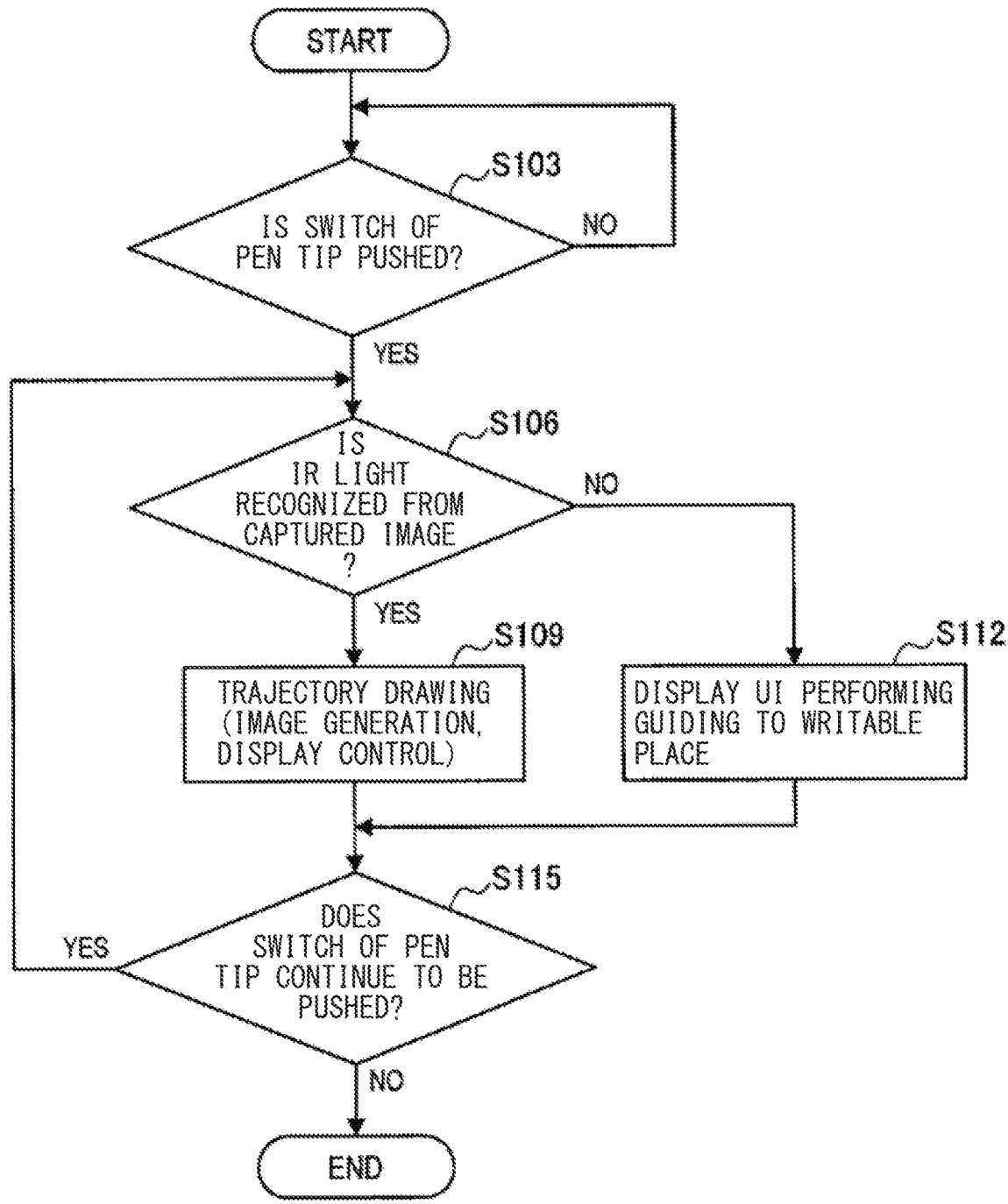

[FIG. 7]
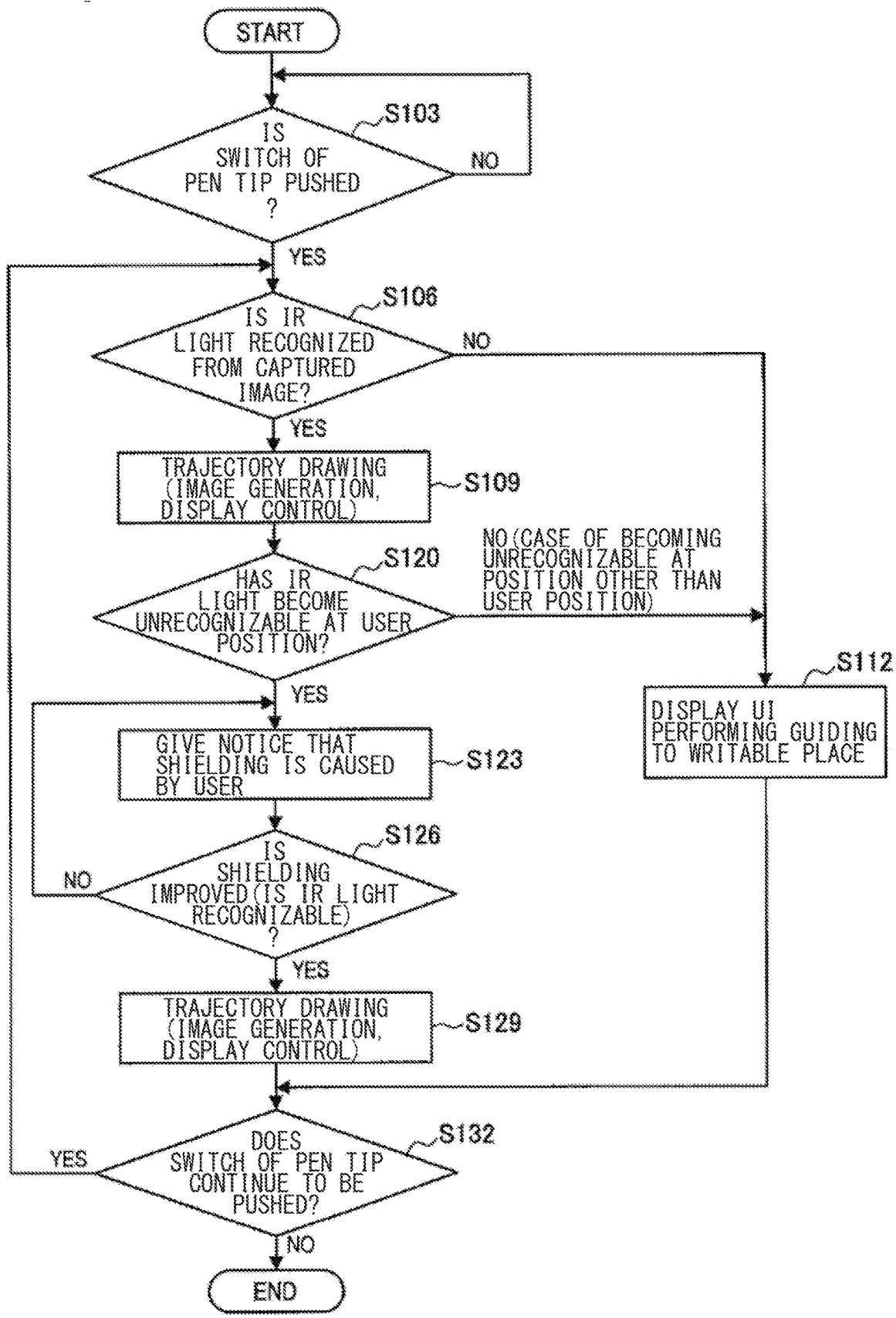

[FIG. 8]
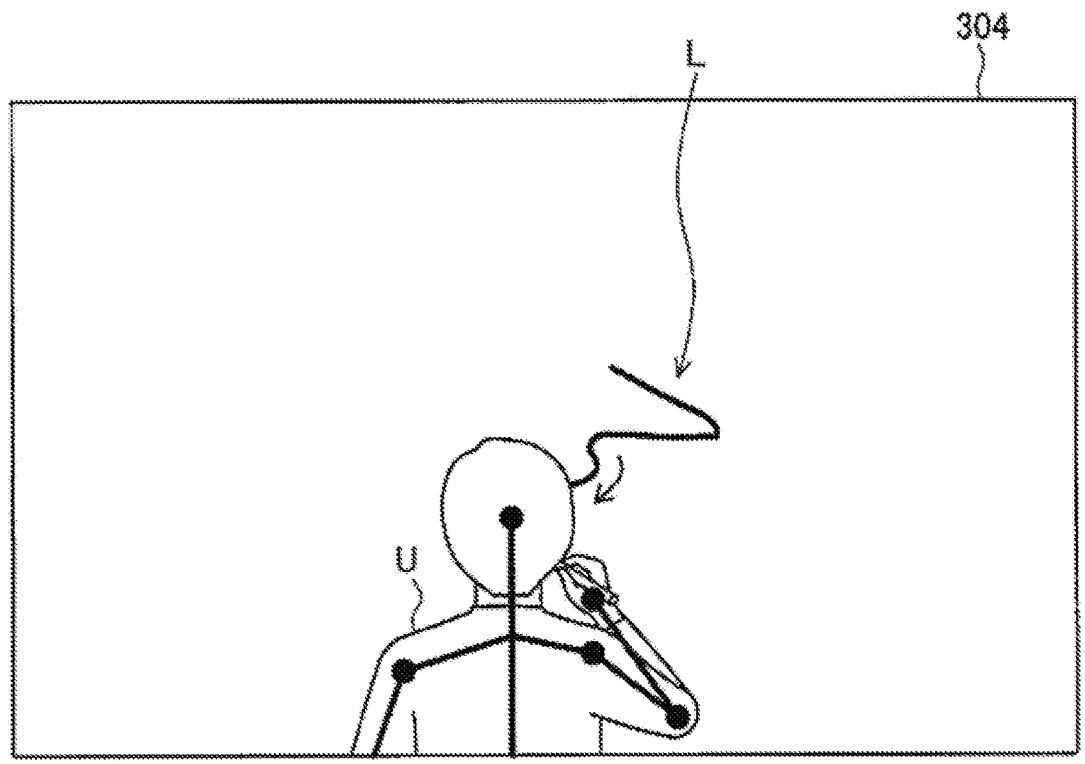
[FIG. 9]
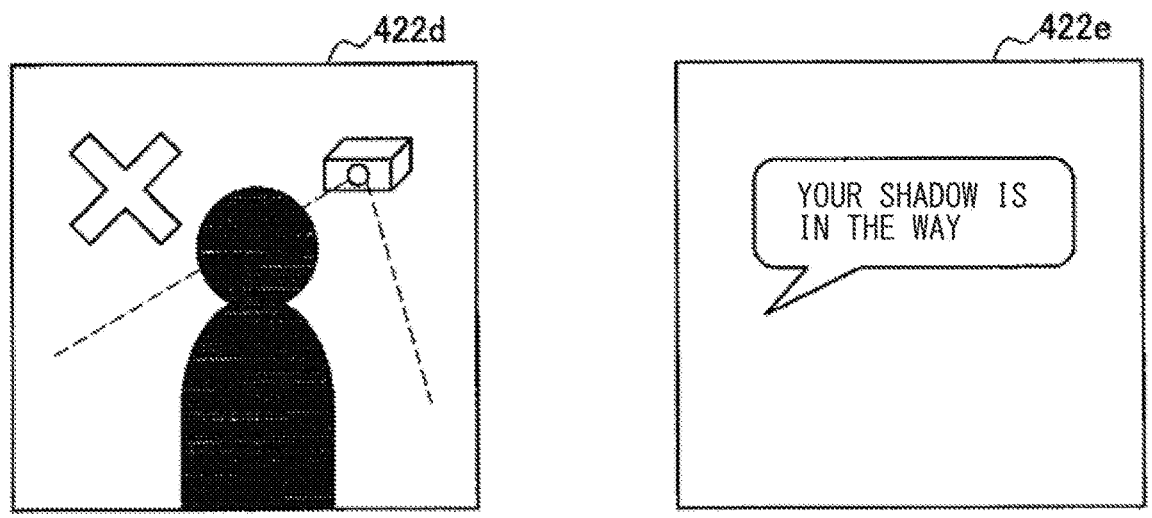

[FIG. 10]
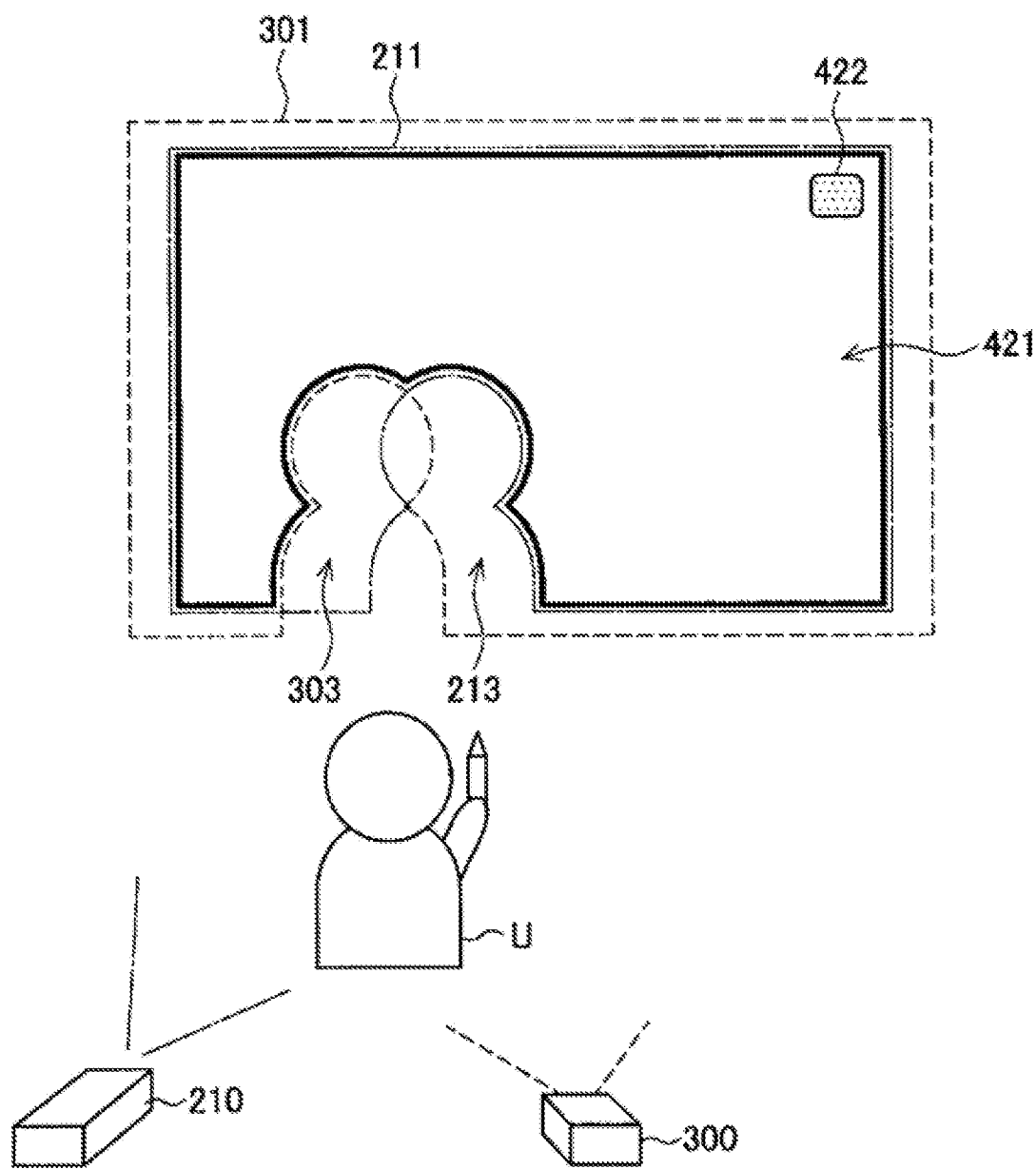

[FIG. 11]
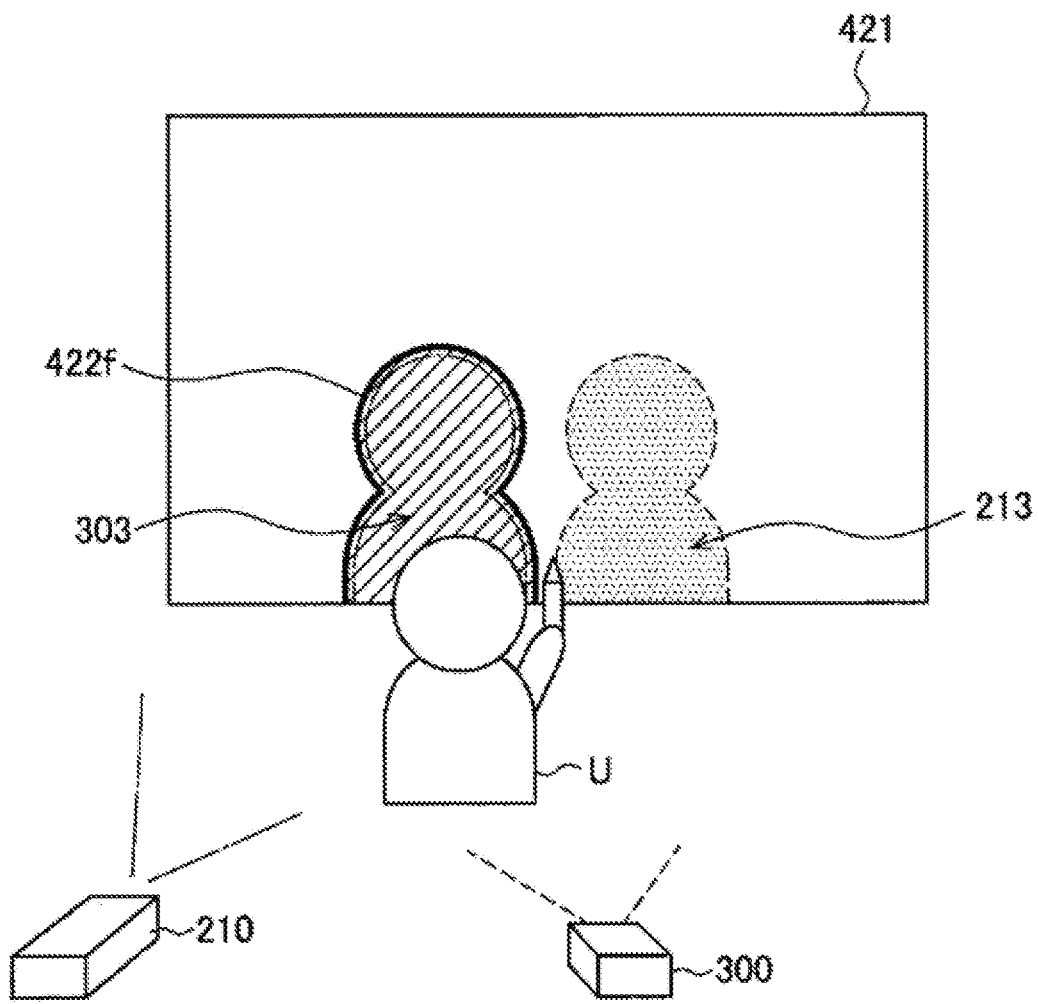

[ FIG. 12 ]
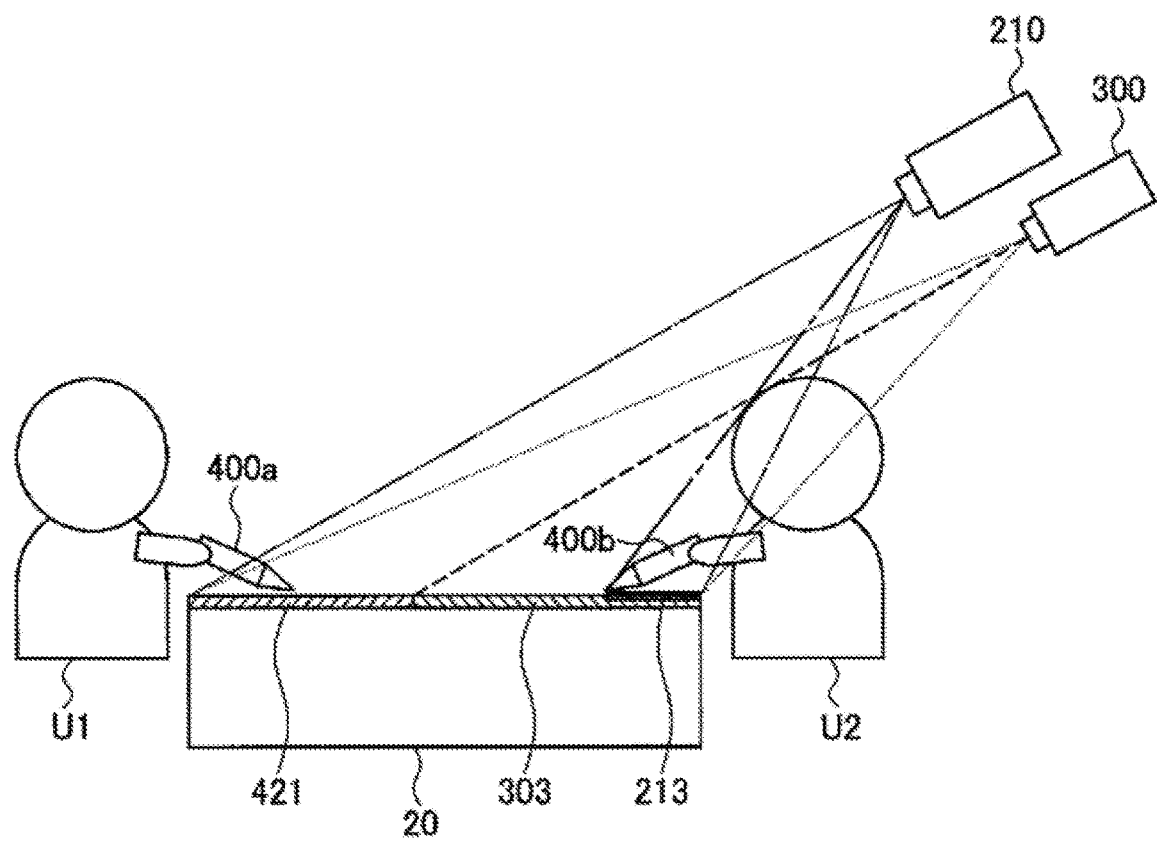

[ FIG. 13 ]
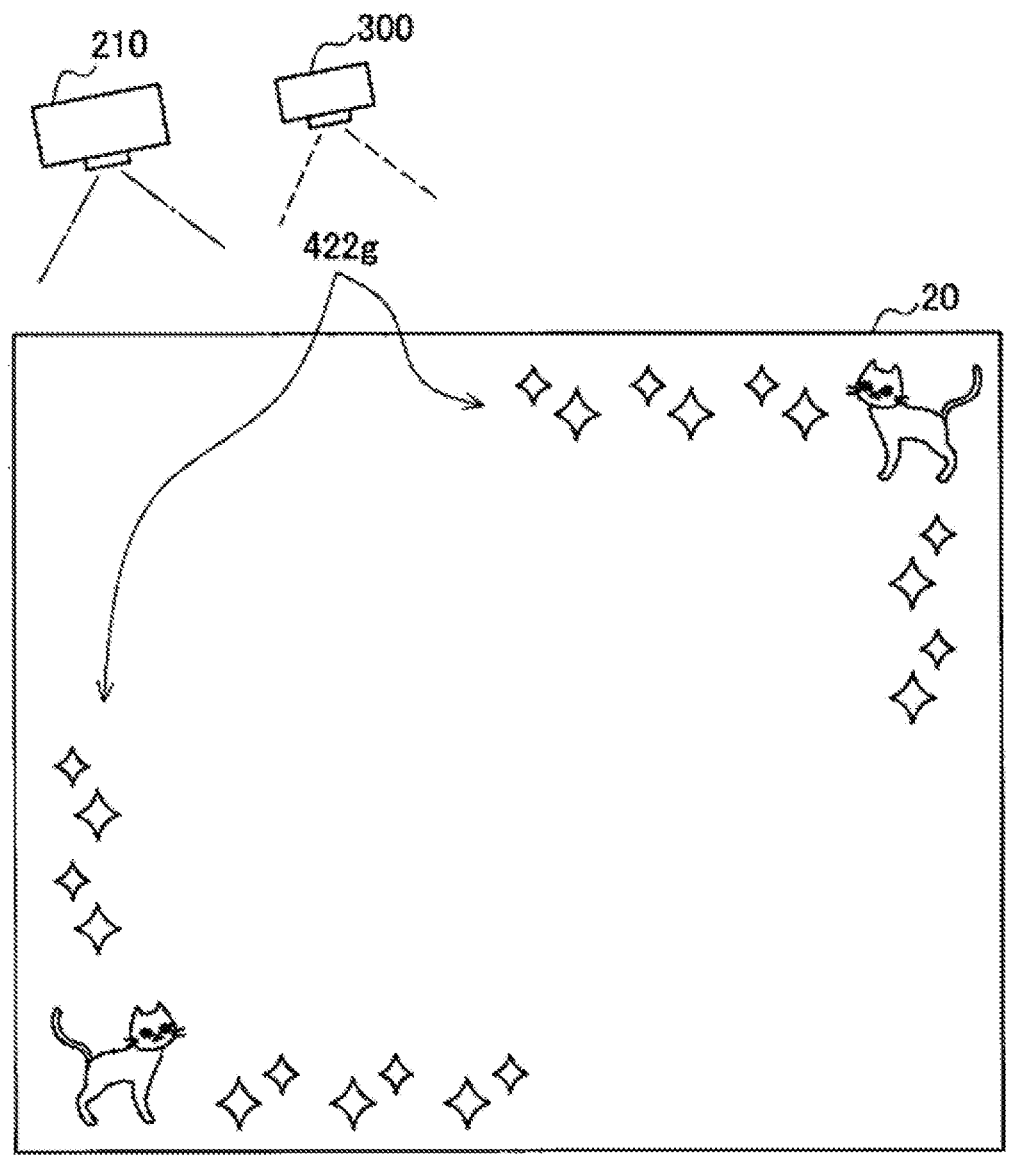

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/035108 (filed on Sep. 6, 2019) under 35 U.S.C. § 371, which claims priority to Japanese Patent Application No. 2018-206588 (filed on Nov. 1, 2018), which are all hereby incorporated by reference in their entirety.

TECHNICAL FIELD

The present disclosure relates to an information processing device, an information processing method, and a program.

BACKGROUND ART

Various display devices have recently been developed, such as fixed display devices including TV receiver (hereinafter simply referred to as TV) and projectors, and mobile display devices including smartphones and notebook PCs (Personal Computers). Further, with the development of the display devices, interfaces and operation methods for controlling the devices have been diversified.

For example, with regard to projectors, in addition to projectors that project images onto screens perpendicular to the ground, as represented by home theaters which have currently been used, the rise of projection mapping techniques have increased the number of cases in which images are projected onto any places such as table surfaces, walls, ceilings, and the like.

Further, in some cases, presentations are made using pointers or the like for pointing images projected by projectors. In these cases, pointers that output infrared light may be utilized. Moreover, systems have also been proposed each of which displays (projects), using a digital pen that outputs IR (infrared spectroscopy) light, a trajectory of the digital pen by a projector. In particular, the systems are useful for digitization of blackboard writing in the education field.

For example, the following PTL 1 discloses a technique of imaging an optical signal (infrared light) outputted from an instruction pen by an IR camera mounted on a projector, and, upon detecting an optical signal having a signal level above a predetermined threshold value, outputting position information of the optical signal.

CITATION LIST

Patent Literature

PTL 1: Japanese Unexamined Patent Application Publication No. 2018-198858

SUMMARY OF THE INVENTION

Problems to be Solved by the Invention

Here, even if an operating tool such as an electronic pen that outputs R light operates normally, a case may occur where a camera is unable to detect the IR light of the electronic pen, because a user (operator) himself/herself shields the IR light of the electronic pen depending on a positional relationship between a projection area, the user, and the camera. However, the typical user who does not grasp a position of the camera. or a mechanism of the detection is unable to understand why drawing has stopped, and thus, inconvenience is imposed on the user.

Means for Solving the Problems

According to the present disclosure, there is proposed an information processing device including a controller that performs a recognition process of recognizing, on a basis of a captured image obtained by imaging a projection area, a position of an operating tool inside the projection area, an operation detection process of detecting, on a basis of sensor data outputted by a sensor included in the operating tool, that an operation is performed on the operating tool, and, in a case where the operation performed on the operating tool is detected by the operation detection process and the position of the operating tool is not recognized by the recognition process, a projection control process of causing a projection section to project an image for guiding the operating tool to a position which is inside the projection area and where the position of the operating tool is recognizable by the recognition process.

According to the present disclosure, there is proposed an information processing method performed by a processor, the method including: recognizing, on a basis of a captured image obtained by imaging a projection area, a position of an operating tool inside the projection area; detecting, on a basis of sensor data outputted by a sensor included in the operating tool, that an operation is performed on the operating tool; and, in a case where the operation performed on the operating tool is detected and the position of the operating tool is not recognized, causing a projection section to project an image for guiding the operating tool to a position which is inside the projection area and where the position of the operating tool is recognizable.

According to the present disclosure, there is proposed a program for causing a computer to function as a controller that performs a recognition process of recognizing, on a basis of a captured image obtained by imaging a projection area, a position of an operating tool inside the projection area, an operation detection process of detecting, on a basis of sensor data outputted by a sensor included in the operating tool, that an operation is performed on the operating tool, and, in a case where the operation performed on the operating tool is detected by the operation detection process and the position of the operating tool is not recognized by the recognition process, a projection control process of causing a projection section to project an image for guiding the operating tool to a position which is inside the projection area and where the position of the operating tool is recognizable by the recognition process.

BRIEF DESCRIPTION OF DRAWINGS

FIG. 1 is a diagram illustrating an outline of an information processing system according to an embodiment of the present disclosure.

FIG. 2 is a diagram illustrating shielding in a case where a user is located between a projector and a projection surface according to the present embodiment.

FIG. 3 is a diagram illustrating shielding in a case where the user is located between a camera and an operating tool according to the present embodiment.

FIG. 4 is a block diagram illustrating an example of an overall configuration of the information processing system according to the present embodiment.

FIG. 5 is a diagram illustrating an example of a guidance image according to the present embodiment.

FIG. 6 is a flowchart illustrating an example of a flow of a display process of the guidance image according to the present embodiment.

FIG. 7 is a flowchart illustrating an example of a flow of a display process of a guidance image corresponding to a factor of non-recognizability according to the present embodiment.

FIG. 8 is a diagram illustrating recognition of a user position and shielding caused by the user according to the present embodiment.

FIG. 9 is a diagram illustrating an example of a guidance image that gives notice of the shielding caused by the user according to the present embodiment.

FIG. 10 is a diagram illustrating a drawable area according to the present embodiment.

FIG. 11 is a diagram illustrating a case where a virtual shadow image is displayed as the guidance image according to the present embodiment.

FIG. 12 is a diagram illustrating a vertical direction of a drawable area according to a modification example of the present embodiment.

FIG. 13 is a diagram illustrating an example of a guidance image that clearly indicates the vertical direction of the drawable area according to the modification example of the present embodiment.

MODES FOR CARRYING OUT THE INVENTION

In the following, some embodiments of the present disclosure are described in detail with reference to the drawings. It is to be noted that, in the following embodiments, components that have substantially the same functional configuration are indicated by the same reference signs, and thus redundant description thereof is omitted.

It is to be noted that description is given in the following order.
1. Outline of Information Processing System According to One Embodiment of the Present Disclosure
2. Configuration Example
   2-1. Output Device 200
   2-2. Camera 300
   2-3. Operating Tool 400
   2-4. Information Processing Device 100
3. Operation Process
   3-1. Display of Guidance Image
   3-2. Display of Guidance Image Corresponding to Factor of Non-Recognizability
4. Modification Example
5. Conclusion 1. Outline of Information Processing System According to One Embodiment of the Present Disclosure FIG. 1 is a diagram illustrating an outline of an information processing system according to an embodiment of the present disclosure. The information processing system according to the present embodiment includes, as illustrated in FIG. 1, a projector 210 that projects an image, a camera 300 that images a projection area 211 (in FIG. 1, an area shot by the camera 300 (so-called angle of view) is illustrated as a recognition area 301), and an information processing device 100 that controls the projection of the image performed by the projector 210.

Further, when a user performs a drawing operation on the projection area 211 using an operating tool 400 (so-called electronic pen), a light-emitting portion (e.g., an IR_LED (Light Emitting Diode)) provided at a pen tip of the operating tool 400 emits light (specifically, the light-emitting portion emits light by a pressing force of the pen tip, for example), and it becomes possible for the information processing device 100 to detect a light-emitting part from a captured image taken by the camera 300 and recognize a position (i.e., a drawing position) of the operating tool 400. The camera 300 is preset as an imaging range (the recognition area 301) that is a range equal to or slightly larger than the projection area 211 of the projector 210, and images light (e.g., IR light) emitted by the operating tool 400. The information processing device 100 continuously recognizes the position of the operating tool 400 on the basis of the captured image taken by the camera 300, generates a trajectory image L indicating a trajectory of the drawing operation with respect to the operating tool 400, and causes the trajectory image L to be projected by the projector 210.

As a result, the present system is able to freely perform drawing using the operating tool 400 on any place (the projection area 211) such as a table surface, a wall, a floor, or the like.

It is to be noted that, the light-emitting portion of the operating tool 400 may be achieved by the IR_LED. In this case, to avoid a false operation due to light other than IR light emitted by the operating tool 400, the camera 300 may be configured to perform imaging via a visible-light-cut filter (i.e., using an IR camera as the camera 300). In such a case, only the IR light of the pen tip is detected from the captured image taken by the camera 300.

However, if the IR light is shielded by any shielding object or the drawing is performed outside the angle of view of the camera 300 (outside the recognition area 301 illustrated in FIG. 1), the system is unable to detect the IR light and to project the trajectory image.

Here, description will be given of an issue of shielding assumed upon performing drawing using the operating tool 400.

FIG. 2 is a diagram illustrating shielding (shielding of the projector 210) in a case where a user is located between the projector 210 and a projection surface (projection area 211) according to the present embodiment. In an example illustrated in FIG. 2, a shadow of the user causes a projection-unavailable area (shield area 213) to be generated in the projection area 211. Usually, in a case where the projector 210 performs projection, a shadow of the user appears, so that the user is relatively easily aware that he/she is shielding the projector 210.

In contrast, it is difficult for the user to notice that he/she is shielding the camera 300 because the shadow does not appear in the case of shielding the camera 300. Hereinafter, a description will be given with reference to FIG. 3.

FIG. 3 is a diagram illustrating the shielding (shielding of the camera 300) in a case where the user is located between the camera and an operating tool according to the present embodiment. In this case, an area (shield area 303) is generated in which the IR light emission of the operating tool 400 is undetectable since the IR light emission is hidden by the user's body, in such a case, the information processing device 100 is unable to recognize the position (trajectory) of the IR light emission and unable to generate the trajectory image L; thus, the user is unable to perform drawing even if the operating tool 400 is normally operated. It is to be noted that no shadow appears in the shield area 303 as in the case of shielding the projector 210 therefore, it is difficult for the user to notice that he himself or she herself is a shielding object.

Further, in the case of the system that projects a trajectory image, it is difficult to understand where the image can be drawn in a situation where nothing is drawn, and there may occur a case where the drawing is started outside the angle of view (outside the recognition area) of the camera 300 and is unable to be executed.

Regarding such an issue that the operating tool 400 which is operating normally is unrecognizable by the camera 300 due to shielding, etc., no feedback to users has been conducted, and the user has had to determine by himself/herself why the drawing has become unavailable. In some cases, this may be improved by actions such as checking the position of the camera 300 and changing the standing position of the user. However, it is difficult to distinguish whether the drawing is unavailable because the user does not know a mechanism of the detection or the drawing is unavailable due to other reasons (e.g., not shielding caused by the user but running out of battery of the operating tool 400, shielding caused by other furniture or movable objects (curtains, etc.), and the like), and thus, inconveniences have been imposed.

Accordingly, the present disclosure proposes a mechanism that is able to enhance convenience of the user by guiding the user to an appropriately recognizable area in the case where the position of the operating tool that is being operated is in an unrecognizable area.

2. Configuration Example

FIG. 4 is a block diagram illustrating an example of an overall configuration of the information processing system according to the present embodiment. As illustrated in FIG. 4, the information processing system according to the present embodiment includes the information processing device 100, an output device 200, the camera 300, and the operating tool 400.

2-1. Output Device 200

The output device 200 includes the projector 210, a TV 220, a tablet 230, a smartphone 240, and a PC 250, It is to be noted that the present system may include one or more of those devices in combination as the output device 200, or the system may include a plurality of devices of one type out of those devices. In the example illustrated in FIG. 1, a system configuration including the projector 210 is illustrated as an example.

The projector 210 is a projector device that projects an image anywhere in a space. The projector 210 may be, for example, a fixed wide-angle projector or may be a so-called moving projector including a movable portion that is able to change a projection direction, such as a Pan/Tilt drive type. The projection surface is not limited to a plane, and may be a curved surface or may be divided into a plurality of surfaces. Further, the projector 210 may be achieved by a plurality of units.

The TV 220 is a device that outputs images and sounds by receiving radio waves of television broadcasting. The tablet 230 is typically a mobile device that has a screen larger than a screen of the smartphone 240, is able to perform radio communication, and is able to output images, sounds, vibrations, and the like. The smartphone 240 is typically a mobile device that has a screen smaller than the screen of the tablet 230, is able to perform radio communication, and is able to output images, sounds, vibrations, and the like. The PC 250 may be a fixed desktop PC, a mobile laptop PC, and is able to output images, sounds, and the like.

The output device 200 outputs information on the basis of control performed by the information processing device 100. In addition to contents of the information to be outputted, the information processing device 100 is also able to control an output method. For example, the information processing device 100 is able to control the projection direction of the projector 210.

Further, the output device 200 may include a component that is able to perform any outputting other than those described above. For example, the output device 200 may include a speaker and a unidirectional speaker. The speaker converts audio data into analog signals via DAC (Digital Analog Converter) and an amplifier, and performs outputting (playing back). The unidirectional speaker is a speaker that is able to form directivity in a single direction. The information processing device 100 may control the directivity of the unidirectional speaker.

Further, the output device 200 may include an illumination device, an air conditioner, a music playback device, or the like.

2-2. Camera 300

The camera 300 is an IR recognition camera for recognizing IR LED provided to the operating tool 400, and is an exemplary sensor device that is able to perform imaging via an IR filters and detect only IR light.

In addition to the camera 300, the present system may include other sensors that sense various types of information. For example, the present system may include a RGB camera, a depth sensor, a microphone, etc. to sense information regarding the user and a space in which the user is located. The depth sensor is a device that acquires depth information such as an infrared-ray distance measurement device, an ultrasonic ranging device, LiDAR (Laser Imaging Detection and Ranging), or a stereoscopic camera. In addition, a ToF (Time Of Flight) camera that is able to acquire high-precision range images may be used. The microphone is a device that collects ambient sounds and outputs audio data converted into digital signals via, an amplifier and ADC (Analog Digital Converter). The microphone may be an array microphone.

The sensor device senses information on the basis of control performed by the information processing device 100. For example, the information processing device 100 may control a zooming rate and an imaging direction of the camera 300.

Further, the sensor device may further include a component that is able to perform any sensing other than those described above. For example, the sensor device may include devices to which information is inputted by the user, such as a mouse, a keyboard, a touch panel, a button, a switch, a lever, and the like. Moreover, the sensor device may also include various sensors such as an acceleration sensor, a gyro sensor, a geomagnetic sensor, an optical sensor, an illuminance sensor, a force sensor, an ultrasonic sensor, a barometric sensor, a gas sensor (Co2), a thermographic camera (far-infrared camera), and the like.

The number of output devices described above and the number of sensor devices described above may be multiple.

2-3. Operating Tool 400

The operating tool 400 is held by the user and is used when the user draws a trajectory on the projection area 211.

Specifically, an IR_LED 430 is provided at a tip (pen tip) of the operating tool 400 as an example of the light-emitting portion, and when drawing is performed by bringing the pen tip in contact with the projection area 211 such as a wall, a switch 440 (sensor) is turned. on by pushing the pen tip, and the IR_LED 430 is controlled to be turned on by a CPU 420. In contrast, when the pen tip is separated from the projection area 211 such as the wall, the pen tip is released from being pushed, the switch 440 is turned off, and the IR_LED 430 is controlled to be turned off by the CPU 420.

It is to be noted that although an example has been described in which the IR_LED 430 emits light by pressing force the pen tip on the grounding surface, the present embodiment is not limited thereto, and the IR_LED 430 may emit light by detecting an operation of a button, a switch, or the like provided to the operating tool 400, or detecting an operation with respect to the operating tool using a motion sensor included in the operating tool.

Further, the operating tool 400 includes a communication module 410. The communication module 410 may be coupled to the information processing device 100 via wire or radio to transmit and receive data. For example, the communication module 410 communicates with the information processing device 100 by wired/wireless LAN (Local Area Network), Wi-Fi (registered trademark, Bluetooth (registered trademark), near field communication, and the like.

The CPU 420 transmits, to the information processing device 100, a predetermined command based on a user's operation on a button or a switch provided to the operating tool 400, movement of the pen, or the like. Specifically. the CPU 420 transmits sensor data(i.e., data indicating that the switch is turned on by pushing the tip, indicating that an operation (drawing operation) has been performed on the operating tool 400) detected by the switch 440 from the communication module 410 to the information processing device 100 on a real-time basis.

It is to be noted that, although the case is mainly described in which the drawing operation of drawing the trajectory using the operating tool 400 here as an example, the operation using the operating tool 400 according to the present embodiment is not limited thereto, and it is also possible to perform various operations such as clicking operations, dragging and dropping operations, turning pages, scrolling operations, and the like on the displayed images.

2-4. Information Processing Device 100

The information processing device 100 includes an I/F (Interface) 110, a light-emission recognizer 120, a storage 130, an operation detector 140, an image generator 150, a coordinate converter 160, a display controller 170, and a user position recognizer 180.

I/F 110

The I/F 110 is a coupling device that couples the information processing device 100 to other devices. The I/F 110 is achieved by, for example, a USB (Universal Serial Bus) connector, a wired/wireless LAN (Local Area Network), Wi-Fi (registered trademark), Bluetooth (registered trademark), a portable communication network (LTE (Long Term Evolution), 3G (third generation mobile communication system)), and the like, and performs input and output of information to and from the output device 200, the camera 300, and the operating tool 400. By performing communication with these devices via the I/F 110, the information processing device 100 is able to control the output device 200, the camera 300, and the operating tool 400. More specifically, for example, the information processing device 100 may perform these controls by outputting control signals to the output device 200, the camera 300, and the operating tool 400 via the I/F 110.

Light-Emission Recognizer 120

The light-emission recognizer 120 detects IR light from a captured image (IR captured image) imaged by the camera 300, recognizes position coordinates (e.g., position coordinates of a bright spot) of the detected IR light, accumulates the position coordinates in the storage 130, and outputs the fact that the IR light has been detected (e.g., the fact that a position of the bright spot has been recognized) to the image generator 150. Further, the light-emission recognizer 120 also has a function (tracking function) of tracking traveling of the detected IR light and acquiring a trajectory of the IR light.

Storage 130

The storage 130 stores the light-emission position coordinates recognized by the light-emission recognizer 120. The storage 130 may also store installation position information of the output device 200 and the camera 300, space recognition information, user position information, and various sensor data. The space recognition information is information acquired/recognized by the information processing device 100 from a projection space (projection environment) on the basis of various sensor data acquired from a sensor device (not illustrated) (a captured image (visible light image, infrared image) taken by a camera or a bird's-eye camera, depth information acquired by a depth sensor, distance information acquired by a distance measurement sensor, temperature information acquired by a thermographic sensor, voice information acquired by a microphone, and the like). Specifically, for example, the information processing device 100 may recognize: a three-dimensional shape of the projection space (projection environment); a three-dimensional shape, a three-dimensional position, and a projectable area (such as a plane area having a predetermined size) of a real object present in the projection space; a three-dimensional position, a posture, a gesture, an utterance, and the like of the user. The information processing device 100 thereafter may store them in the storage 130 as the space recognition information.

Operation Detector 140

The operation detector 140 has a function to detect that an operation has been performed on the operating tool on the basis of the sensor data received from the operating tool 400. Specifically, for example, upon receiving sensor data (i.e., data indicating that the switch is turned on by pushing the tip) detected by the switch 440 provided to the operating tool 400, the operation detector 140 is able to detect that an operation (drawing operation in this case) has been performed on the operating tool 400. Further, the operation detector 140 outputs the operation detection result to the image generator 150.

Image Generator 150

The image generator 150 generates an image to be displayed by the output device 200. For example, the image generator 150 generates an image (trajectory image L) displaying a trajectory drawn by the operating tool 400 in response to the drawing operation performed by the operating tool 400. Specifically, the image generator 150 generates, on the basis of display coordinate information corresponding to the trajectory of the IR light acquired from the coordinate converter 160, an image that displays the trajectory and outputs the image to the display controller 170.

Further, the image generator 150 according to the present embodiment generates an image (guidance image) for guiding the operating tool 400 to an area (hereinafter also referred to as "drawable area") within the projection area 211 and recognizable by the camera 300, in a case where the light emission is not recognized (i.e., the position of the operating tool 400 is not recognized) by the light-emission recognizer 120 even though the operation (drawing operation in this case) on the operating tool 400 is detected by the operation detector 140. In the case where the light emission is not recognized even though the operation on the operating tool 400 is detected, there is assumed a case where the user performs the operation outside the recognition area 301 of the camera 300, or a case where the IR light of the operating tool 400 is shielded by the user, furniture, or movable objects (curtains, etc.), for example.

Here, FIG. 5 illustrates an example of the guidance image according to the present embodiment. As described above, in the case where the light emission is not recognized even though the operation on the operating tool 400 is detected, since the operating tool 400 is in a normally usable state (not running out of battery or the like) and in a drawable state, it is desirable to display an illustration, an icon, a guide, or the like that indicates, in an intuitively understandable manner, the fact that it is possible to perform drawing, as the guidance image. Specifically, for example, illustration images and icons of pens as illustrated in guidance images 422a and 422b of FIG. 5, or a guidance display for prompting drawing such as "Let's draw!" or the like may be displayed on the drawable area.

Coordinate Converter 160

In response to a request from the image generator 150, the coordinate converter 160 calls information of a trajectory of a target from the storage 130, calculates coordinates at which an image for the target is to be displayed from the information of the trajectory, and outputs the calculated coordinates to the image generator 150.

Display Controller 170

The display controller 170 controls outputting of the image generated by the image generator 150 to the output device 200 via the I/F 110 and displaying of the image to be performed by the output device 200. For example, the display controller 170 performs control to cause the trajectory image generated by the image generator 150 to be projected by the projector 210. Further, the display controller 170 performs control to cause the guidance image generated by the image generator 150 to be projected by the projector 210. The guidance image may be displayed at a predetermined position such as an edge of the drawable area, may be displayed at a position where the IR light has been finally recognized, or may be displayed at a position corresponding to an installation direction of the camera 300 or the projector 210 (e.g., at a right edge in a case where the camera 300 is located in the right direction of the drawable area). This makes it possible to make a guidance to an appropriately recognizable area, to enhance the convenience of the user.

User Position Recognizer 180

The user position recognizer 180 has a function of recognizing a position of the user on the basis of a captured image. For example, in a case where the present system uses an RGB IR camera as the camera 300, it is possible to acquire a visible light image and an IR image simultaneously. In this case, the user position recognizer 180 is able to recognize a position of a person from the visible light image by bone estimation or the like. On the basis of the recognized position of the user and whether or not the light emission recognition based on the IR image is possible, the information processing device 100 is able to determine that the light emission of the operating tool 400 is shielded by the user. It is to be noted that upon performing the bone estimation based on the visible light image, it is also possible to acquire not only a bone position but also an area of the human body by using an inter-frame difference method. Still further, a thermographic camera, a depth camera, or a ToF sensor may be prepared in addition to the IR camera for recognizing light emission, thereby extracting a contour (area of the human body) of the user (it is desirable that an optical axis of these sensors be as close as possible to the IR camera).

The light-emission recognizer 120, the operation detector 140, the image generator 150, the coordinate converter 160, the display controller 170, and the user position recognizer 180 described above may be achieved by a controller (not illustrated) provided to the information processing device 100. The controller functions as an arithmetic processing unit and a control unit, and controls overall operations in the information processing device 100 in accordance with various programs. The controller is achieved, for example, by an electronic circuit such as CPU (Central Processing Unit) or a microprocessor. Further, the controller may include a ROM (Read Only Memory) that stores programs and arithmetic parameters to be used, and a RAM (Random Access Memory) that temporarily stores parameters which vary as appropriate.

Further, the configuration of the information processing device 100 according to the present embodiment is not limited to the example illustrated in FIG. 4. For example, the information processing device 100 may be configured by a plurality of devices, or at least some of the functional configurations of the information processing device 100 illustrated in FIG. 4 may be provided to the output device 200, the camera 300, or the operating tool 400. Moreover, the information processing device 100 does not necessarily have all the functional configurations illustrated in FIG. 4.

In addition, the information processing device 100 may also be achieved by a PC, a smartphone, an edge server, an intermediate server, or a cloud server.

3. Operation Process

Subsequently, an example of a flow of a display process of the guidance image according to the present embodiment will be described with reference to the drawings.

3-1. Display of Guidance Image

FIG. 6 is a flowchart illustrating an example of a flow of a display process of the guidance image according to the present embodiment. As illustrated in FIG. 6, first, the information processing device 100 determines whether or not the switch 440 of the pen tip is pushed (by the drawing operation) by the operation detector 140 on the basis of sensor data transmitted from the operating tool 400 (step S103).

Next, if it is determined that the switch 440 of the pen tip is pushed (step S103/Yes), the light-emission recognizer 120 recognizes the IR light from the captured image (IR image) of the camera 300 (step S106). Here, as an example, the IR light-recognition process is performed upon detecting that the switch 440 of the pen tip is pushed. However, the present embodiment is not limited thereto, and the IR light-recognition process may be performed continuously (at all times).

Thereafter, if the IR light is recognized (step S106/Yes), the information processing device 100 performs trajectory drawing (step S109). Specifically, the information processing device 100 generates a trajectory image in accordance with the position coordinates of the IR light by the image generator 150, and performs control to cause the projector 210 to display (project) the trajectory image by the display controller 170.

In contrast, if the IR light is not recognized (step S106/No), the information processing device 100 displays a UI (guidance image) for guiding the operating tool 400 to a writable place (drawable area within the projection area 211 and recognizable by the camera 300) at the writable place (step S112). Specifically, the information processing device 100 generates a guidance image (or acquire a guidance image prepared in advance), and performs control to cause the projector 210 to display (project) the guidance image by the display controller 170. As a result, the user is able to intuitively understand that it is not running out of battery of the operating tool 400 or a system trouble and it is possible to perform the drawing, and that it is possible to perform the drawing in the periphery where the guidance image is displayed.

Thereafter, the information processing device 100 repeats the process illustrated in steps S106 to S112 described above while the switch 440 of the pen tip continues to be pushed (while the operation in the operating tool 400 continues to be detected by the operation detector 140) (step S115).

3-2. Display of Guidance Image Corresponding to Factor of Non-Recognizability

If the information processing device 100 according to the present embodiment further determines, on the basis of a position of the user, that a factor of not being able to recognize the IR light is shielding caused by the user, the information processing device 100 is able to give notice that the shielding caused by the user is taking place as the guidance image and prompt the user to take an appropriate action.

FIG. 7 is a flowchart illustrating an example of a flow of a display process of a guidance image corresponding to a factor of non-recognizability.

In steps S103 to S109 illustrated in FIG. 7, a process similar to the steps described referring to FIG. 6 is performed. In other words, if the switch 440 of the pen tip of the operating tool 400 is pushed (by the drawing operation) (step S103), the information processing device 100 recognizes the IR light (step S106), and performs trajectory drawing (generation and displaying of the trajectory image) (step S109).

Next, the information processing device 100 determines whether or not the IR light has become unrecognizable at a user position (step S120). Specifically, it is appreciated that the IR light is shielded by the user, in a case where the IR light has become unrecognizable by the light-emission recognizer 120 and a place where the IR light has become unrecognizable is the user position recognized by the user position recognizer 180 even though the drawing operation is detected by the operation detector 140. FIG. 8 is a diagram illustrating recognition of the user position and the shielding caused by the user. For example, in a case where the present system uses the RGB IR camera as the camera 300, a visible light image 304 as illustrated in FIG. 8 may be acquired, and the user position recognizer 180 recognizes the user position by bone estimation or the like on the basis of the visible light image 304. Thereafter, in a case where the IR light tracked by the light-emission recognizer 120 moves toward a region recognized as the user position and becomes unrecognizable (lost) (in the middle of drawing), the image generator 150 is able to determine that the IR light is shielded by the user.

Next, if the IR light has become unrecognizable at the user position (step S120/Yes), the image generator 150 determines that the IR light is shielded by the user, generates an image (guidance image) which gives notice that the IR light is shielded by the user, and the display controller 170 controls the generated guidance image to be projected by the projector 210 (step S123). Here, FIG. 9 illustrates an example of the guidance image that gives notice of the shielding caused by the user according to the present embodiment. For example, a guidance image 422d of FIG. 9 is an icon image indicating how the user enters into an angle of view of the camera and is standing in the way. Further, a guidance image 422e of FIG. 9 is a guidance display such as "Your shadow is in the way". By displaying such a guidance image, the user is able to intuitively understand that it is not possible to perform drawing (to be recognized) due to the standing position of the user, and is able to make an improvement by confirming the position of the camera 300 and changing the standing position of the user.

Further, the display controller 170 controls the guidance image to be displayed on the drawable area. Referring now to FIG. 10, the drawable area according to the present embodiment will be described. As illustrated in FIG. 10, the recognition area 301 corresponding to the imaging range of the camera 300 may be preset to be a range that is equal to or slightly larger than the projection area 211. In addition, in the present embodiment, an area that is the projection area 211 and the recognition area 301, and further excludes the shield area 213 (area in which the user shields the projection area 211 of the projector 210) and the shield area 303 (area in which the user shields the recognition area 301 of the camera 300) is defined as a drawable area 421. The display controller 170 may display the guidance image 422 at a predetermined position such as the edge of the drawable area 421, at a position at which the IR light has been recognizable for the last time, or at a position corresponding to the installation direction of the camera 300 or the projector 210 (e.g., the right edge when the camera 300 is located in the right direction of the drawable area).

It is possible to appropriately calculate the shield area 213 and the shield area 303 on the basis of a visible light image acquired by a visible-light camera, a three-dimensional position of the user, a three-dimensional position of the camera 300, a three-dimensional position of the projector 210, a three-dimensional position of the projection area 211, a three-dimensional position of the recognition area 301, a positional relationships and distances therebetween, etc.

Here, although a real shadow is generated in the shield area 213, no shadow is generated in the shield area 303 where the camera 300 is shielded; thus, the information processing device 100 may generate a virtual shadow image indicating the shield area 303 (at least a contour of the shield area 303) as the guidance image by the image generator 150 and display the virtual shadow image. FIG. 11 is a diagram illustrating a case where the virtual shadow image is displayed as the guidance image. As illustrated in FIG. 11, in the drawable area 421, the real shadow appears in the shield area 213 where the user shields the projection by the projector 210, while no shadow appears in the shield area 303 where the user shields the imaging by the camera 300; thus, a virtual shadow image 422f is generated and the projector 210 displays the virtual shadow image 422f at a position of the shield area 303. As a result, the user is able to intuitively understand that it is not possible to perform the drawing in the area of the shadow of the user, and to make an improvement by changing the standing position or the like. It is to be noted that an example has here been described in which the image indicating the contour of the shield area 303 is generated and displayed as the guidance image, but the present embodiment is not limited thereto. For example, the image generator 150 of the information processing device 100 may generate an image (e.g., a simple rectangular image including the shield area 303) corresponding to the position and a size of the shield area 303 as the guidance image. For example, in a case where a process that is able to reduce a process load compared to contour extraction is suitable, the image generator 150 of the information processing device 100 may generate and display a rectangular image corresponding to the position and the size of the shield area.

Further, the shadow of the user normally appears in the case of the projection performed by the projector 210; therefore, it is relatively easy for the user to notice that the user is shielding the projector 210. However, in a case where a background color of an image to be projected is black and information to be displayed is white, a shadow does not appear, because nothing is projected on projection area by default. In this case, the information processing device 100 may also display a virtual shadow on the shield area 213 of the projector 210. The shield area 213 of the projector 210 may be calculated on the basis of the position of the user, an installation position the projector 210, and a place of projection area. Alternatively, in a case where the projector 210 and the camera 300 are installed close to each other and the optical axes of thereof are as close as possible or coaxial with each other, the shield area 303 of the camera 300 is expressed as a virtual shadow, thereby causing the user to recognize the virtual shadow also as the shadow of the projector 210. It is to be noted that also in this case, the guidance image indicating the shield area 213 of the projector 210 is not limited to the image of contour extraction. For example, the image generator 150 of the information processing device 100 may generate an image corresponding to a position and a size of the shield area 213 (e.g., a simple rectangular image including the shield area 213).

Thereafter, if the shielding is improved by changing the standing position of the user or the like (i.e., in a case where the IR light becomes recognizable again by the light-emission recognizer 120) (step S126/Yes), the information processing device 100 generates the trajectory image and performs control to display the trajectory image again (step S129).

In contrast, if the IR light is not recognizable (step S106/No) or if the IR light becomes unrecognizable at a position other than the user position (step S120/No) in the middle of recognizing the light (in the middle of drawing), the information processing device 100 displays the UI (guidance images 422a to 422c as illustrated in FIG. 5) for guiding the operating tool 400 to the writable place (drawable area) in the same manner as in the embodiment described with reference to FIG. 6 at the writable place (step S112). The case of being unrecognizable at the position other than the user position is assumed to be a case where the IR light is out of the recognition area 301 (moved out of the angle of view) or a case where the IR light is shielded by a shielding object other than the user, for example, furniture or movable objects. As a result, the user is able to intuitively understand that it is not running out of battery of the operating tool 400 or a system trouble and it is possible to perform the drawing, and that it is possible to perform the drawing in the periphery where the guidance image is displayed. It is to be noted that, in a case where the shielding object has been recognized by object recognition or the like based on a captured image, or in a case where it has been recognized that shielding occurs due to any shielding object, the information processing device 100 may display a guidance image for giving notice of the shielding.

The information processing device 100 repeats the process illustrated in steps S106 to S112 and S120 to S129 described above while the switch 440 of the pen tip continues to be pushed (step S134).

4. Modification Example

Subsequently, a modification example of the present embodiment will be described.

4-1. Clear indication of Vertical Direction of Drawable Area by Guidance Image The guidance image according to the present embodiment may further indicate a vertical direction of the drawable area in accordance with the installation position of the projector 210 or the camera 300.

FIG. 12 is a diagram illustrating the vertical direction of the drawable area according to the modification example of the present embodiment. As illustrated in FIG. 12, a case is assumed where, for example, a top surface of a table 20 is the projection area and the user is able to draw from any direction.

In the periphery of the table 20, the projector 210 that projects a trajectory image onto the top surface of the table 20 and the camera 300 that images IR light emission (drawing) of the operating tools 400a and 400b are installed.

Here, depending on a positional relationship of the projector 210 and the camera 300 to the user, there may be a place (i.e., an undesirable, disadvantageous position) at which shielding caused by the user easily occurs.

For example, as illustrated in FIG. 12, no shielding occurs at a standing position of a user U1, but at a standing position of a user U2, the shield area 213 is generated by shielding the projection of the projector 210 that performs projection from behind the user U12, and the shield area 303 is generated by shielding the imaging of the camera 300. It is not possible to perform drawing (recognition, projection) in the shield area 213 and the shield area 303, and has a disadvantage that a size of the drawable area 421 decreases.

Therefore, in the present modification example, in order to clearly indicate a desirable standing position (drawing direction) to the user, the information processing device 100 may display a guidance image in which the vertical direction is indicated in the case where the shielding occurs (for example, a case where an operating tool 400b used by the user U2 is being operated but the light emission is unrecognizable, or the like). The vertical direction may be determined according to the positions of the projector 210 and the camera 300. That is, the guidance image that indicates the vertical direction is to guide the user to the desirable and advantageous standing position (direction) corresponding to the positions of the projector 210 and the camera 300.

FIG. 13 is a diagram illustrating an example of the guidance image that clearly indicates the vertical direction of the drawable area according to the present modification example. For example, as illustrated in FIG. 13, a frame-like guidance image 422g including illustrations such as animals that indicate the top and bottom may be displayed. Further, other illustrations, icons, guide displays (characters), and the like that indicate the top and bottom may be displayed. This allows the user to intuitively understand the preferred standing position (drawing direction).

4-2. Disposition of Projector 210 and Camera 300

In the embodiment described above, the case where the projector 210 and the camera 300 are installed apart from each other has been described, but the present embodiment is not limited thereto. The projector 210 and the camera 300 may be installed such that the optical axis centers thereof are as close as possible or coaxial with each other, thereby regarding the shielding of the projector 210 as the shielding of the camera 300 and the guidance display may be performed.

5. Conclusion

That is, in the case where the projector 210 and the camera 300 are installed such that the optical axis centers thereof are as close as possible or coaxial with each other, the place of the shield area 303 in the case where the user shields the imaging of the camera 300 is expected to be substantially the same as the place of the shield area 213 in the case where the user shields the projection of the projector 210. Thus, the information processing device 100 may regard the place of the user's shadow (shield area 213 of the projector 210) as the shield area 303 of the camera 300, and, in a case where the IR light has become unrecognizable in the vicinity thereof, notice may be given that the user is the factor of non-recognizability as illustrated in FIG. 9.

A preferred embodiment(s) of the present disclosure has/ have been described above in detail with reference to the accompanying drawings, but the technical scope of the present disclosure is not limited to such an embodiment(s). It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

Further, it is also possible to create a computer program for causing hardware such as the CPU, the ROM, and the RAM, which are built in the information processing device 100, the output device 200, the camera 300, or the operating tool 400 to exhibit functions of the information processing device 100, the output device 200, the camera 300. or the operating tool 400 described above. Further, there is also provided a storage medium having the computer program stored therein.

Furthermore, the effects described herein are merely illustrative and exemplary, and not limiting. That is, the technique according to the present disclosure can exert other effects that are apparent to those skilled in the art from the description herein, in addition to the above-described effects or in place of the above-described effects.

It is to be noted that the present technology may have the following configurations.

(1)

An information processing device including
a controller that performs
a recognition process of recognizing, on a basis of a captured image obtained by imaging a projection area, a position of an operating tool inside the projection area,
an operation detection process of detecting, on a basis of sensor data outputted by a sensor included in the operating tool, that an operation is performed on the operating tool, and,
in a case where the operation performed on the operating tool is detected by the operation detection process and the position of the operating tool is not recognized by the recognition process, a projection control process of causing a projection section to project an image for guiding the operating tool to a position which is inside the projection area and where the position of the operating tool is recognizable by the recognition process.

(2)

The information processing device according to (1), in which the controller performs a projection control process of causing the image for the guiding to be projected at a predetermined position which is at an edge of the projection area.

(3)

The information processing device according to (1) or (2), in which the controller
recognizes a shield area that is shielded by a shielding object, and
performs a projection control process of causing the projection section to project the image for the guiding at a position which is inside the projection area and where the position the operating tool is recognizable by the recognition process, the position excluding the shield area.

(4)

The information processing device according to (3), in which the shield area includes, within the projection area, an area where it is not possible to perform projection due to a shielding object or an area where the position of the operating tool is unrecognizable due to the shielding object.

(5)

The information processing device according to any one of (1) to (4), in which the controller performs a projection control process of causing the projection section to project the image for the guiding at a position which is inside the projection area and where the position of the operating tool is recognizable by the recognition process, the position corresponding to an installation position of an imaging device that acquires the captured image or a projection device that performs the projection.

(6)

The information processing device according to any one of (1) to (5), in which the controller performs a projection control process of causing the projection section to project the image for the guiding al a position which is inside the projection area and where the position of the operating tool is recognizable by the recognition process, the position being where the operating tool has been recognizable for a last time.

(7)

The information processing device according to (3) or (4), in which the controller
recognizes the shielding object, and,
in a case where the controller determines that, on a basis of the position of the shielding object that has been recognized, a factor of the position of the operating tool being unrecognizable is shielding caused by the shielding object, performs a projection control process of causing the projection section to project an image that gives notice of the factor as the image for the guiding.

(8)

The information processing device according to (7), in which the shielding object is a user who operates the operating tool.

(9)

The information processing device according to (7) or (8), in which the controller performs a projection control process of causing the projection section to project, as the image for the guiding, an image corresponding to a position and a size of a shield area inside the projection area.

(10)

The information processing device according to (9), in which the controller performs a projection control process of causing the projection section to project, as the image for the guiding, an image indicating a contour of the shield area inside the projection area.

(11)

The information processing device according to any one of (1) to (10), in which the controller performs a projection control process of causing the projection section to project an image indicating a vertical direction as the image for the guiding, in accordance with a positional relationship of an imaging device and a projection device with respect to the projection area.

(12)

The information processing device according to any one of (1) to (11), in which the controller recognizes position coordinates of the operating tool inside the projection area by detecting, from the captured image, light emission performed by a light-emitting portion included in the operating tool.

(13)

The information processing device according to any one of (1) to (12), in which the controller detects, on a basis of the sensor data, that a drawing operation using the operating tool is performed by a user on the projection area, as the operation performed on the operating tool.

(14)

The information processing device according to any one of (1) to (13), further including an interface that outputs a control signal to the projection section.

(15)

An information processing method performed by a processor, the method including:

recognizing, on a basis of a captured image obtained by imaging a projection area, a position of an operating tool inside the projection area.

detecting, on a basis of sensor data outputted by a sensor included in the operating tool, that an operation is performed on the operating tool; and, in a case where the operation performed on the operating tool is detected and the position of the operating tool is not recognized, causing a projection section to project an image for guiding the operating tool to a position which is inside the projection area and where the position of the operating tool is recognizable.

(16)

A program for causing a computer to function as a controller that performs a recognition process of recognizing, on a basis of a captured image obtained by imaging a projection area, a position of an operating tool inside the projection area, an operation detection process of detecting, on a basis of sensor data outputted by a sensor included in the operating tool, that an operation is performed on the operating tool, and, in a case where the operation performed on the operating tool is detected by the operation detection process and the position of the operating tool is not recognized by the recognition process, a projection control process of causing a projection section to project an image for guiding the operating tool to a. position which is inside the projection area and where the position of the operating tool is recognizable by the recognition process.

REFERENCE SIGNS LIST 100 information processing device
110 I/F
120 light-emission recognizer
130 storage
140 operation detector
150 image generator
160 coordinate converter
170 display controller
180 user position recognizer
200 output device
210 projector
211 projection area
213 shield area
220 TV
230 tablet
240 smartphone
250 PC
300 camera
301 recognition area
303 shield area
304 visible light image
400 operating tool
410 communication module
421 drawable area
422 (422a to 422g) guidance image
430 IR_LED
440 switch

The invention claimed is:

1. An information processing device comprising
a controller that performs
a recognition process of recognizing, on a basis of a captured image obtained by imaging a projection area, a position of an operating tool inside the projection area,
an operation detection process of detecting, on a basis of sensor data outputted by a sensor included in the operating tool, that an operation is performed on the operating tool, and,
in a case where the operation performed on the operating tool is detected by the operation detection process and the position of the operating tool is not recognized by the recognition process, a projection control process of causing a projector to project an image for guiding the operating tool to a position which is inside the projection area and where the position of the operating tool is recognizable by the recognition process.

2. The information processing device according to claim 1, wherein the controller performs a projection control process of causing the projector to project the image for the guiding at a predetermined position which is at an edge of the projection area.

3. The information processing device according to claim 1, wherein the controller recognizes a shield area that is shielded by a shielding object, and performs a projection control process of causing the projector to project the image for the guiding at a position which is inside the projection area and where the position of the operating tool is recognizable by the recognition process, the position excluding the shield area.

4. The information processing device according to claim 3, wherein the shield area includes, within the projection area, an area where it is not possible to perform projection due to a shielding object or an area where the position of the operating tool is unrecognizable due to the shielding object.

5. The information processing device according to claim 1, wherein the controller performs a projection control process of causing the projector to project the image for the guiding at a position which is inside the projection area and where the position of the operating tool is recognizable by the recognition process, the position corresponding to an installation position of an imaging device that acquires the captured image or a projection device that performs the projection.

6. The information processing device according to claim 1, wherein the controller performs a projection control process of causing the projector to project the image for the guiding at a position which is inside the projection area and where the position of the operating tool is recognizable by the recognition process, the position being where the operating tool has been recognizable for a last time.

7. The information processing device according to claim 3, wherein the controller
recognizes a position of the shielding object, and,
in a case where the controller determines that, on a basis of the position of the shielding object that has been recognized, a factor of the position of the operating tool being unrecognizable is shielding caused by the shielding object, performs a projection control process of causing the projector to project an image that gives notice of the factor as the image for the guiding.

8. The information processing device according to claim 7, wherein the shielding object is a user who operates the operating tool.

9. The information processing device according to claim 7, wherein the controller performs a projection control process of causing the projector to project, as the image for the guiding, an image corresponding to a position and a size of a shield area inside the projection area.

10. The information processing device according to claim 9, wherein the controller performs a projection control process of causing the projector to project, as the image for the guiding, an image indicating a contour of the shield area inside the projection area.

11. The information processing device according to claim 1, wherein the controller performs a projection control process of causing the projector to project an image indicating a vertical direction as the image for the guiding, in accordance with a positional relationship of an imaging device and a projection device with respect to the projection area.

12. The information processing device according to claim 1, wherein the controller recognizes position coordinates of the operating tool inside the projection area by detecting, from the captured image, light emission performed by a light-emitting portion included in the operating tool.

13. The information processing device according to claim 1, wherein the controller detects, on a basis of the sensor data, that a drawing operation using the operating tool is performed by a user on the projection area, as the operation performed on the operating tool.

14. The information processing device according to claim 1, further comprising
an interface that outputs a control signal to the projector.

15. An information processing method performed by a processor, the method comprising:
recognizing, on a basis of a captured image obtained by imaging a projection area, a position of an operating tool inside the projection area;
detecting, on a basis of sensor data outputted by a sensor included in the operating tool, that an operation is performed on the operating tool; and,
in a case where the operation performed on the operating tool is detected and the position of the operating tool is not recognized, causing a projector to project an image for guiding the operating tool to a position which is inside the projection area and where the position of the operating tool is recognizable.

16. A non-transitory computer-readable medium having embodied thereon a program, which when executed by a computer causes the computer to execute a method, the method comprising:
recognizing, on a basis of a captured image obtained by imaging a projection area, a position of an operating tool inside the projection area,
detecting, on a basis of sensor data outputted by a sensor included in the operating tool, that an operation is performed on the operating tool, and,
in a case where the operation performed on the operating tool is detected and the position of the operating tool is not recognized, causing a projector to project an image for guiding the operating tool to a position which is inside the projection area and where the position of the operating tool is recognizable.

* * * * *